April 28, 1970 R. R. KINSEY 3,509,577
TANDEM SERIES-FEED SYSTEM FOR ARRAY ANTENNAS
Filed Nov. 14, 1968

INVENTOR:
RICHARD R. KINSEY,

BY Norman C. Fulmer
HIS ATTORNEY.

United States Patent Office 3,509,577
Patented Apr. 28, 1970

3,509,577
TANDEM SERIES-FEED SYSTEM FOR
ARRAY ANTENNAS
Richard R. Kinsey, De Witt, N.Y., assignor to General
Electric Company, a corporation of New York
Filed Nov. 14, 1968, Ser. No. 775,891
Int. Cl. H01q 3/26
U.S. Cl. 343—854                                    6 Claims

ABSTRACT OF THE DISCLOSURE

An array antenna system is disclosed, of the center-fed type, in which each row of radiation elements is fed by a pair of series-feed lines in tandem. These tandem series feed lines, for each row, are coupled at the center of the row by an assembly of hybrid couplers and directional couplers in a configuration which achieves sum-and-difference monopulse transmission and reception of signals via utilization of both of the tandem feed lines. A principal advantage provided by the disclosed arrangement, is an improvement in the independence of excitation of the sum and difference modes of operation, which permits high gain and angular sensitivity as well as improved suppression of undesired sidelobes and a wider bandwidth of operating frequency. A tilted-line embodiment also is disclosed.

The invention herein described was made in the course of or under a contract or subcontract thereunder, with the United States Air Force.

BACKGROUND OF THE INVENTION

The invention is in the field of array antennas, for transmitting and/or receiving radiation, which employ a plurality of signal radiation elements in relatively fixed positions. As used herein, "radiation elements" means array elements for transmitting and/or receiving radiation of desired frequencies such as are used for radar, sonar, and other applications. The operating frequency, or the relative phases at the radiation elements, may be varied so as to control the beam shape and directivity.

A linear (straight-line) array can vary the directivity in a single plane, and a planar array, which may be formed by stacking linear arrays, can vary the directivity in two planes. The elements of the array may comprise, for example, dipoles, microwave horns, or other suitable radiators for high frequencies such as are used for radar, or piezoelectric transducers such as are used for sonar.

In a series-fed array, the radiation elements are electrically coupled to a feed line (such as a waveguide) at suitable points therealong. In a center-fed series array, the two halves of a series-fed array are coupled together for feeding signals to or from the array, at the center of each row (or column) of radiation elements. The center coupling means for the center-fed series array frequently comprises a hybrid junction providing, with respect to the two halves of the array, a sum-signal port and a difference-signal port. For monopulse operation, the transmitted radar or sonar pulse signal is usually applied to the "sum" port whereupon it is radiated by both halves of the array in an additive manner to provide a single main beam of radiated energy. The received echo pulses, on the other hand, are fed to the receiver from both the "sum" and "difference" ports and represent the vector sum and difference of the echo signals received by the two halves of the array. The difference-signal beam pattern of the array constitutes a pair of anti-phase lobes which provide a sharply defined null on the boresight line for achieving improved resolution and accuracy in tracking or determining the position of a target.

The amplitude distribution produced by a single center-fed series feed network has the same magnitude for either the sum or difference modes and as a result, the lowest simultaneous pattern sidelobes are limited to about —20 db relative to the peak of the sum pattern. Further suppression of pattern sidelobes for one mode can only be realized at the expense of increased sidelobe levels in the other pattern mode. There has thus been a need and desire for improvements in independence of the sum and difference operational modes; in beam directivity and monopulse angular sensitivity in suppression of undesired sidelobes; and in increased frequency bandwidth operational capability.

SUMMARY OF THE INVENTION

Objects of the invention are to provide an improved center-fed series-feed array antenna, and to provide such an antenna with greater independence of the sum and difference excitation modes and a wider bandwidth of operating frequency capability than has been readily attainable heretofore.

The invention comprises, briefly and in a preferred embodiment, an arrangement in which a pair of hybrid junctions are respectively connected to a pair of tandem series feed lines at the centers thereof for intercoupling the two halves of each of the series feed lines. Each of the series feed lines is coupled at spaced points therealong to a plurality of elemental branch feed lines adapted for connection to radiation elements. A pair of signal couplers are respectively connected for intercoupling signals at the sum ports, and at the difference ports, of the two directional couplers. This arrangement of the invention, which has been named a tandem feed, utilizes both of the series feed lines for both the sum mode and the difference mode of operation, thus achieving increased independence of the modes of operation and other advantages described herein. A phase inverter is inserted between the difference port of one of the hybrid junctions and the associated siinal coupler, for desired difference-signal operation. Compensating phase shifters are connected in the elemental feed lines between the points of cross-coupling to the series feed lines. In accordance with another feature of the invention, the series feed lines are tilted with respect to each other, in a manner to compensate for differences in delays in the two feed line systems. This eliminates the need for compensating phase shifters.

DESCRIPTION OF THE PREFERRED EMBODIMENTS

Figure 1:
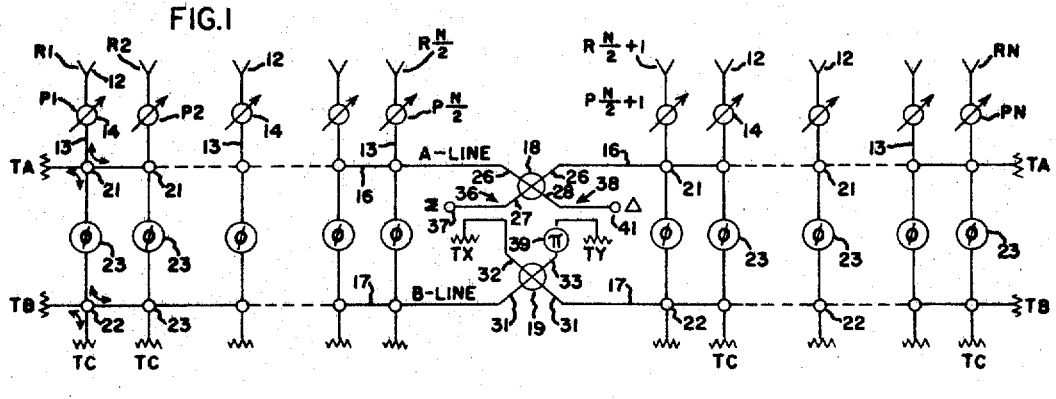
FIGURE 1 is a schematic representation of a preferred embodiment of the invention.

FIGURE 1 shows the invention embodied in a system of the type comprising a linear array antenna utilizing variable controlled phase shifters to achieve beam forming and steering for transmitting and receiving. The antenna comprises a plurality of radiation elements 12 (also individually designated R1, R2 ... RN) arranged in linear array and symmetrically disposed with respect to the center of the array. A plurality of elemental feed lines 13 are respectively connected to feed signals to and from the radiation elements 12 via phase shifters 14 (also individually designated P1, P2 ... PN) the phases of which are controlled by signals applied thereto from a steering command signal source (not shown) in well known manner. An "A-line" series feed line 16, and "B-line" series feed line 17 are arranged in a tandem relationship with respect to the elemental feed lines 13. The A-line 16 is connected at its center by a hybrid junction 18, and the B-line 17 is connected at its center by a hybrid junction 19. The elemental feed lines 13 are coupled to the A-line 16 by means of cross-guide couplers 21, and also are coupled to the B-line 17 by means of cross-guide couplers 22, at spaced points therealong, as shown. Compensating phase shifters 23 are respectively interposed in the elemental feed lines 13 between the various cross-guide couplers 21 and 22. Each of the A and B lines 16 and 17 is, in effect, a series feed line, the A-line 16 being terminated at the ends thereof by termination loads TA, the B-lines 17 being terminated at the ends thereof by termination loads TB, and the elemental feed lines being terminated at the ends thereof by terminations TC, for impedance matching purposes.

Further details of a series feed configuration are disclosed in Kinsey Patent No. 3,258,774; further details of a preferred embodiment of the phase shifters 14 are disclosed in Hair Patent No. 3,290,622; and further details of a preferred embodiment of the cross-guide couplers 21 and 22 are disclosed in Kinsey Patents No. 3,230,483 and 3,377,571, these patents being assigned to the same assignee as the present invention.

The hybrid juction 18 may be of a conventional four port type having two 3 db ports or terminals 26 respectively connected to the two halves of the A-line 16, and also having a sum signal port 27 and a difference signal port 28. Similarly, the hybrid junction 19 has a pair of 3 db ports 31 respectively connected to the two halves of the B-line 17, and also has a sum signal port 32 and a difference signal port 33. A signal coupler 36, which may be, for example, of the multiple-hole broadwall type, has a pair of signal ports respectively connected to the sum signal ports 27 and 32 of the hybrid junctions 18 and 19; another port connected to a sum-signal terminal 37; and the remaining port is connected to an impedance matching load TX. Similarly, another signal coupler 38, which may in general have a coupling value the same as or different from 36, has a pair of ports respectively connected to the difference signal ports 28 and 33 of the hybrid junctions 18 and 19, there being a phase inverter 39 interposed in the aforesaid connection to the difference port 33 of hybrid junction 19. Another port of the signal coupler port 38 is connected to a difference-signal terminal 41, and the remaining port is connected to an impedance matching termination TY.

The functioning of the embodiment of FIGURE 1 will now be described, for monopulse tracking radar or sonar operation in which transmitted pulses are applied to the sum signal terminal 37 and received echo pulses are obtained from both the sum signal terminal 37 and the difference signal terminal 41. The transmission modulated carrier pulses are applied to the terminal 37, and the signal coupler 36 applies this pulse energy (not necessarily in equal amounts) to the sum ports 27 and 32 of the hybrid junctions 18 and 19. The ports 26 of the hybrid junction 18 distribute the pulse energy equally to the two halves of the A-line 16, whereupon the pulse energy is distributed in certain predetermined amounts to the radiation elements 12, via the phase shifters 14, by means of the cross-guide couplers 21. Similarly, the ports 31 of the hybrid junction 19 apply the transmitted pulse energy equally to the two halves of the B-line 17, and the cross guide couplers 22 feed the signal, in various predetermined amounts, into the elemental feed lines 13 where they combine with the A-line signals at the cross-guide couplers 21 in a manner to be described. Excess energy at the ends of the A-line and B-line may be absorbed by the waster termination loads TA and TB.

Upon the reception of an echo pulse signal by the radiation elements 12, the received signal is fed, via the phase shifters 14, into the elemental feed lines 13 from which a portion of the received pulse is fed into the A-line 16 by the cross-guide couplers 21, and another portion thereof is fed into the B-line 17 by the cross-guide couplers 22. The incoming signal in the A-line is fed into the ports 26 of the hybrid junction 18, and the incoming signal of the B-line is fed into the ports 31 of the hybrid junction 19. The incoming signals from the sum ports 27 and 32 of the hybrid junctions are coupled to the sum signal terminal 37 via the signal coupler 36, and the signals from the difference ports 28 and 33 are coupled to the difference signal terminal 41 via the signal coupler 38, the phase inverter 39 being interposed as shown in one of the difference port connections in order to insure proper difference signal phasing in the signal coupler 38.

Figure 3:
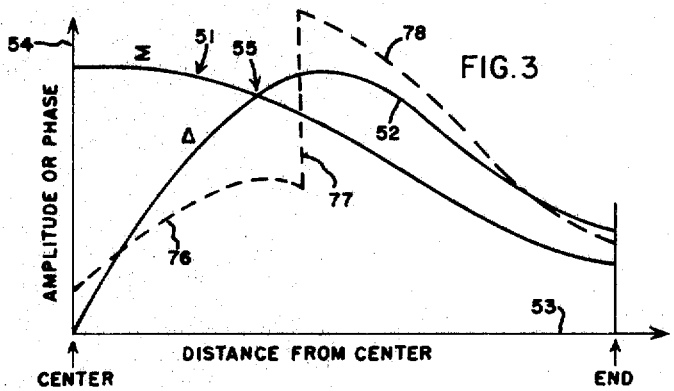
FIGURE 3 is a graph showing the sum and difference excitation, and compensating phase shifts along each half of the arrays shown in FIGURES 1 and 2, and FIGURES 4 and 5 illustrate phase relationship of the cross-guide couplers employed in FIGURES 1 and 2.

Before describing the particular design characteristics of the cross-guide couplers 21 and 22 with respect to other components in the system, it will be helpful as a basis to the understanding thereof, to explain why different array characteristics are desirable for the sum signal and for the difference signals, which in turn is the reason that complete independence of sum and difference excitation modes is desirable. For the sum signal mode of operation, the factors of main importance are maximum amplitude of the signal main beam, along with a low amount of sidelobe radiation. As is well known, this is readily achieved by means of an amplitude density taper along each half of the array approximating a Taylor type excitation function, similar to the sum signal distribution curve 51 shown in FIGURE 3. In the difference-signal mode of operation, however, the factor of primary importance is a high degree of angular beam sensitivity along with a low amount of sidelobe radiation. To achieve this, the amplitude taper of a row of radiation elements should be peaked near the center of each half of the array, as shown by the difference-signal curve 52 in FIGURE 3. In FIGURE 3 the horizontal axis 53 represents distance outwardly along each half of the array from the center, and the vertical axis 54 represents amplitude of the radiation elements with respect to curves 51 and 52 and represents phase with respect to the curve 77 which will be described subsequently. These independent sum and difference characteristics are achieved by the tandem array of the present invention.

Figure 4:
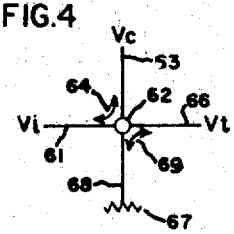
Figure 5:
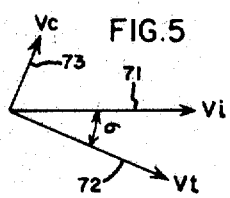

A basis for understanding the theory of tandem series feed operation, and for programming a computer to solve for optimum coupling values of the cross-guide couplers 21 and 22, can be understood with reference to FIGURES 4 and 5. In FIGURE 4, the input signal $V_i$ is fed to the input arm or port 61 of a cross-guide coupler 52 (which may be used as a cross-guide coupler 21 or 22 in FIGURE 1) and a portion $V_c$ thereof is cross-coupled to the coupled voltage port 63, as indicated by arrow 64, and the transmitted voltage $V_t$ continues at port 66. Reverse direction waves are cross-coupled to the terminating load 67 at coupler port 68, as indicated by the arrow 69. In the diagram of FIGURE 5, the input voltage $V_i$ is shown by the phasor 71, the transmitted voltage $V_t$ shown by the phasor 72, at an angle $\sigma$ with respect to the $V_i$ phasor, and the coupled voltage $Vc$ is indicated by the phasor 73, which is at a 90° angle with respect to the transmitted voltage 72. The coupled and transmitted waves can be expressed by the equations $$Vc = jVi \sin(\sigma)e^{-j\sigma}$$

and $$Vt = Vi (\cos)(\sigma)e^{-j\sigma}$$

These expressions assume perfect coupler directivity and satisfy the conservation of energy, in that $$|Vi|^2 = |Vc^2| + |Vt|^2$$

Consider a 10 db cross-guide coupler. With one unit of input power, the normalized voltages in the coupled and transmitted ports will be as follows:

$$Vc = j0.316 \exp(-j18.4°)$$

and $$Vt = 0.948 \exp(-18.4°)$$

Now, referring again to FIGURE 4, if a normalized voltage of $$V = j0.333$$

is introduced at port 68, the normally terminated port of the cross-guide coupler, its contribution at the port 63 will be $$Vo = j0.316 \exp(-j18.4°)$$

which is exactly equal in amplitude and opposite in phase to the voltage coupled to port 63 from the port 61. By superposition, the net wave at the port 63, is now zero. The net wave in the main arm or port 66, on the other hand, is increased to a value $$Vm = 0.948 \exp(-j18.4°) + 0.105 \exp(-j18.4°)$$
$$= 1.053 \exp(-j18.4°)$$

This satisfies the conservation of energy requirement, since $$(1.0)^2 + (0.333)^2 = (1.053)^2$$

If, contrary to the above, the voltage wave introduced into the normally terminated port of the coupler had been oppositely phased, the net coupled wave in arm 63 and the net transmitted wave in arm 66 would have amplitudes of 0.632 and 0.843, respectively. Again this combination of values satisfies the conservation of energy criterion. It is clear that the net amplitude of the in-phase and out-of-phase additions can be determined by the proper control of the two wave contributions.

The phase shift values of the fixed phase shifters 23 are chosen to compensate for the phase shifts caused by the relative phase-shift actions of the cross-guide couplers 21 and 22, and by the difference in length of signal travel via the elemental feed lines 13. With the aid of a digital computer, solutions can be obtained based on the above-described factors. The design values of the cross-guide couplers, fixed phase shifters, and the power division between the A and B lines can be computed so as to provide the two independent desirable excitation characteristics for the sum and difference modes of operation, as shown by the curves 51 and 52 in FIGURE 3.

In the computer aided design, as described above, it is found that the values of the fixed phase shifters 23 can be made to vary in an approximately linear manner as indicated by the dashed line curve 76 of FIGURE 3, there being an abrupt phase reversal of 180° at a point 77 along the length of each half of the array, at a point slightly outward from the crossover point 55 of the sum and difference distribution curves 51 and 52. In the embodiment shown, this phase reversal discontinuity occurs near the mid-point of each half of the array, and therefore the fixed phase shifter 23 at this point, as well as the subsequent phase shifters located outwardly with respect thereto, must include this 180° phase shift value as indicated by curve 78 of FIGURE 3.

Figure 2:
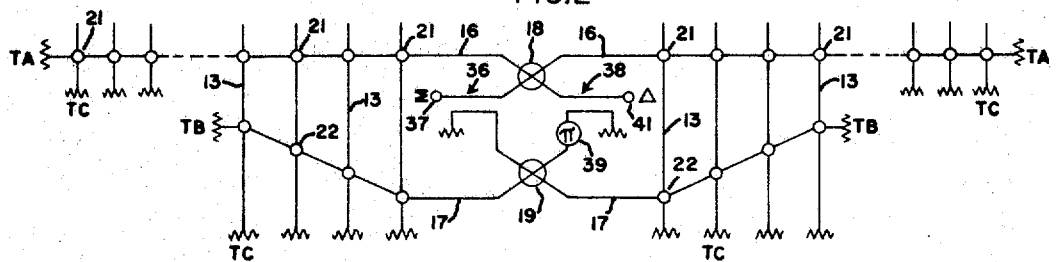
FIGURE 2 is an electrical diagram of an alternative preferred embodiment of the invention.

In the embodiment shown in FIGURE 2, the elements thereof which are the same as elements shown in FIGURE 1, are given the same reference numerals as in FIGURE 1. The embodiment of FIGURE 2 is the same as that of FIGURE 1, except that the separate fixed phase shifters 23 are eliminated in the elemental lines 13, and each half of the B-line is tilted with respect to the A-line and is shorter than the A-line. The amount by which the B-line is tilted toward the A-line is proportional to the linear approximation of the phase error correction curve 76 of FIGURE 3, thereby correcting for the differences in relative phase caused by the length of line 13 between the cross-couplers 21 and 22, and also differences in directional phase shifts of the directional couplers 21 and 22 in each elemental feed line 13. This tilting of the B-lines, in proportion to the tilt of the phase correction curve 76, eliminates the need for the separate fixed phase shifters 23 utilized in FIGURE 1. The B-lines 17 in FIGURE 2 terminate along each half of the array, at a point just short of the occurrence of the phase reversal 77 shown in FIGURE 3, because of the physical impractability of providing sufficient tilt or other phase correction means at the point of the phase discontinuity 77. The truncated B-line of FIGURE 2 contains a sufficient number of separate wave contributions to the couplers 21 and the A-line, to substantially achieve the objects of the invention.

The invention, by tandem feeding the elemental lines coupled to the radiation elements and by intercoupling the A-line and B-line at the centers thereof for both sum and difference modes of operation, achieves the objectives of improved independence of sum and difference modes of operation so as to achieve desired characteristics as have been described with reference to FIGURE 3, thereby achieving the objects of the invention.

While preferred embodiments of the invention have been shown and described, various other embodiments and modifications thereof will become apparent to persons skilled in the art.

What I claim is:

1. An array antenna of the center-fed series-feed type having a plurality of elemental feed lines coupled to radiation elements, wherein the improvement comprises a pair of tandem series feed lines, means coupling each of said series feed lines to said elemental feed lines at spaced points therealong, a pair of hybrid junction means having sum and difference signal ports, said hybrid junctions being respectively coupled to said series feed lines at the centers thereof to provide for sum and difference signal modes respectively at said sum and difference signal ports, a sum signal terminal, a first signal coupler means connected to couple said sum signal terminal to the sum signal ports of both of said hybrid junctions, a difference signal terminal, and a second signal coupler means connected to couple said difference signal terminal to the difference signal ports of both said hybrid junctions.

2. An array antenna as claimed in claim 1, including a 180° phase reversal means interposed in the connection of said second signal coupler means to one of said difference signal ports.

3. An array antenna as claimed in claim 1, including a plurality of phase shifters respectively interposed in said elemental feed lines between said points of coupling thereof to said pair of series feed lines, said phase shifters having phase shift values to compensate for relative phase shifts of signals in said series feed lines and elemental feed lines.

4. An array antenna as claimed in claim 1, in which said pair of series feed lines are tilted with respect to each other so as to compensate for relative phase shifts of signals in said series feed lines and elemental lines.

5. An array antenna as claimed in claim 4, in which a first line of said pair of series feed lines is relatively closer to said radiation elements than is the second of said series feed line, there being a 180° discontinuity, in each half of the array, in the required compensation for said relative phase shifts, said second series feed line being truncated so as to be coupled to only the elemental feed lines that are inwardly toward the center of the array from said discontinuity.

6. An array antenna as claimed in claim 1, in which said first and second signal couplers each have the same signal coupling value.

References Cited

UNITED STATES PATENTS

| | | |
|---|---|---|
| 3,293,648 | 12/1966 | Kuhn. |
| 3,202,992 | 8/1965 | Kent et al. _____ 343—100 |
| 3,346,861 | 10/1967 | Chadwick et al. ____ 343—100 X |
| 3,438,044 | 4/1969 | Elia et al. _____ 343—16 X |

OTHER REFERENCES

Lopez, A. R.: Monopulse Networks for Series Feeding an Array Antenna, IEEE G–AP International Symposium, October 17–19, 1967, pp. 93–101.

RODNEY D. BENNETT, JR., Primary Examiner

T. H. TUBBESING, Assistant Examiner

U.S. Cl. X.R.

343—16, 100